(No Model.)
H. B. & E. LINGFORD.
APPARATUS FOR FEEDING CALVES.
No. 488,693.
Patented Dec. 27, 1892.
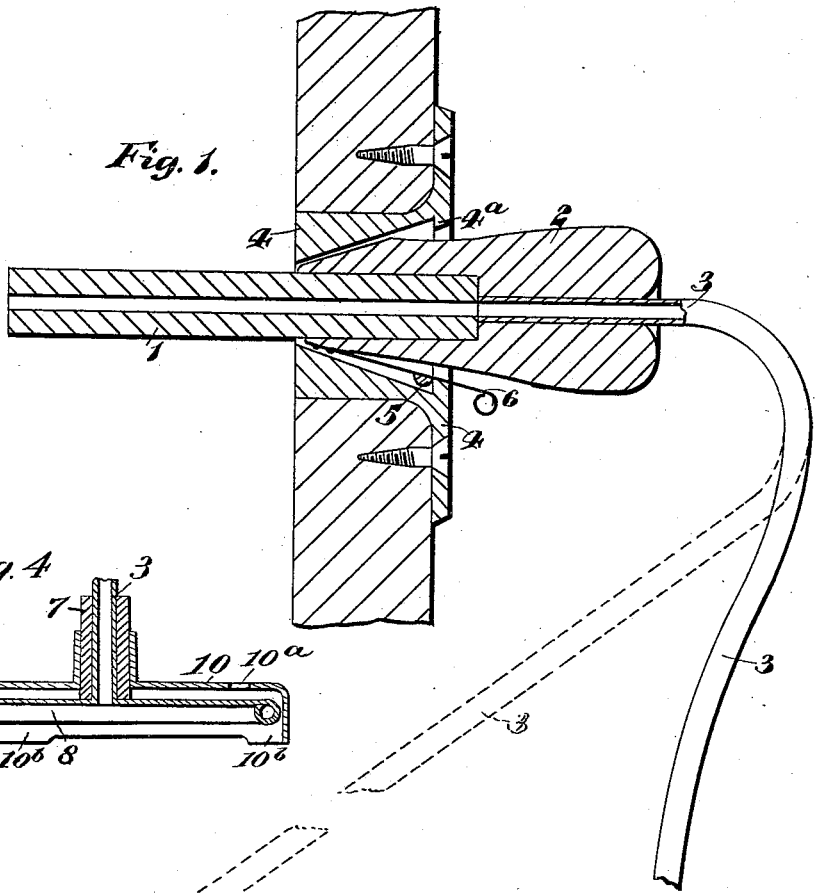
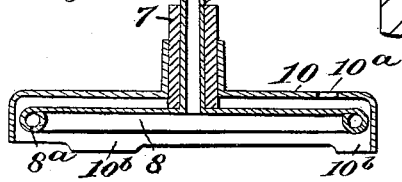
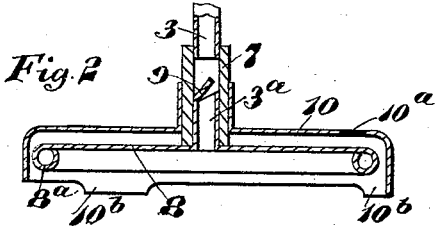
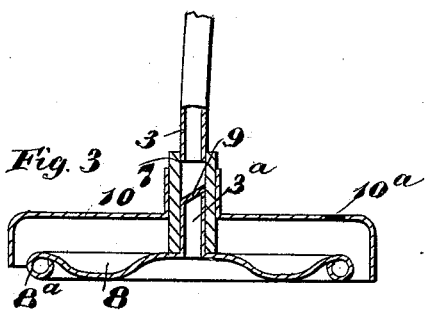
Witnesses
James Miller
Albert Edward Ellen
Inventors
Henry Bowman Lingford & Edward Lingford
by George Henry Rayner
their Attorney

UNITED STATES PATENT OFFICE.

HENRY BOWMAN LINGFORD AND EDWARD LINGFORD, OF RIPON, ENGLAND.

APPARATUS FOR FEEDING CALVES.

SPECIFICATION forming part of Letters Patent No. 488,693, dated December 27, 1892.

Application filed January 26, 1892. Serial No. 419,363. (No model.) Patented in England March 1, 1890, No. 3,309, and in Germany May 31, 1890, No. 54,589.

*To all whom it may concern:*

Be it known that we, HENRY BOWMAN LINGFORD and EDWARD LINGFORD, farmers, subjects of the Queen of Great Britain and Ireland, residing at North Road, Ripon, in the county of York, England, have invented Improvements in Apparatus for Feeding Calves, (patented in England March 1, 1890, No. 3,309, and in Germany May 31, 1890, No. 54,589,) of which the following is a specification.

This invention relates to improvements in the method of artificially feeding calves, in which milk is sucked by the calf, through a tube, from a pail or other receptacle; and the object of our improvements is to prevent the animal sucking in air when all the milk is drawn from the pail. We attain this object by the mechanism illustrated in the accompanying drawings, in which Figure 1 is a section of the part of our apparatus which is fitted in the wall or partition of the house containing the animal, and through which it draws the liquid, and Figs. 2 and 3 are vertical sections of the other portion situated in the milk pail, Fig. 2 showing the relative positions of the different parts, while milk remains in the receptacle, and Fig. 3 when the milk is drawn off, the calf continuing to suck. Fig. 4 is a section similar to Fig. 2 showing a similar construction.

Referring to Fig. 1, 1 is the mouth-piece consisting of a short tube of thick indiarubber projecting into the house containing the calf, so that it can be seized by the animal. This mouth-piece is fixed in the wooden plug 2, in which also an end of flexible indiarubber tubing 3 is fitted, forming with the mouth piece a continuous passage leading to the milk receptacle. In order that the plug may be fitted into the wall, a hole is formed in the wall, and a metal ring 4 having its internal diameter tapering from the outside to the inside inserted, a small flange $4^a$ being provided to hold a projection 5 on the spring 6. The plug 2 is tapered at its inner end to fit the tapering passage of the ring, and the spring 6 is fixed to the tapered part so that it rests against the flange $4^a$ when the plug is inserted. With this arrangement, when the apparatus is to be disengaged, the spring is pressed back, allowing the plug to be readily pulled out. The other end of the tubing 3 (Figs. 2 and 3) is inserted in the short tube 7, which contains also the tube $3^a$ carrying on its end an indiarubber disk 8, having a rim $8^a$ formed by turning over its edge. The tube 7 contains a valve formed by a small cap 9 on the top of the tube $3^a$, which prevents any liquid drawn into the tube 3 escaping back to the pail. This valve may be dispensed with, and in that case the disk would be connected onto the tube 3 as shown in Fig. 4. These parts are attached to a cover 10 of thin enameled sheet iron, having holes $10^a$ and three short legs $10^b$.

This apparatus is lowered to the bottom of the pail, resting on the three legs $10^b$. The milk passes through the holes $10^a$ and between the legs into the tubes on suction being applied, while any milk remains. Immediately the pail is emptied, if suction continues, the pressure of the atmosphere forces the disk 8 down into the position shown in Fig. 3, against the bottom of the pail, forming an air tight seal.

What we claim as our invention, and desire to secure by Letters Patent is:—

1. In an apparatus for feeding calves, the combination of a device placed in the food receptacle consisting of a flexible disk 8 with rim $8^a$ and cover 10 with a mouthpiece 1 and tube 3 connecting the mouth-piece to the flexible disk, substantially as described and for the purposes specified.

2. In an apparatus for feeding calves, the combination of a mouthpiece 1, fixed in a plug 2, the plug being attached to the wall or partition of the house containing the animal to be fed, by means of the spring 6 with projections 5 engaging with the flange $4^a$, on the metallic ring or socket 4, a device, placed in the receptacle containing the food, consisting of a case or cover 10, inclosing a disk 8, through which the tube 3, communicating with the mouthpiece, opens, substantially as described and shown, and for the purposes specified.

3. In an apparatus for feeding calves, the combination of a mouthpiece 1, fixed in a plug 2, capable of being inserted in the wall of the house containing the animal, with a device placed in the receptacle containing the food, connected with the mouthpiece by a tube 3, consisting of flexible disk 8 with rim 8ª, a cover 10, and a tube 7, connected to the tube 3, containing a valve formed by a small cap 9 on a short tube 3ª, opening through the disk 8, substantially as described and illustrated in the accompanying drawings and for the purposes specified.

In witness whereof we have hereunto set our hands in the presence of two witnesses.

HENRY BOWMAN LINGFORD.
EDWARD LINGFORD.

In presence of—
ALFRED PROCTOR,
  *Notary Public, York, England.*
C. DOWNEY,
  *Solr's Clerk, York.*